(Model.)
G. W. PROUTY.
FISHING REEL.
No. 396,956. Patented Jan. 29, 1889.
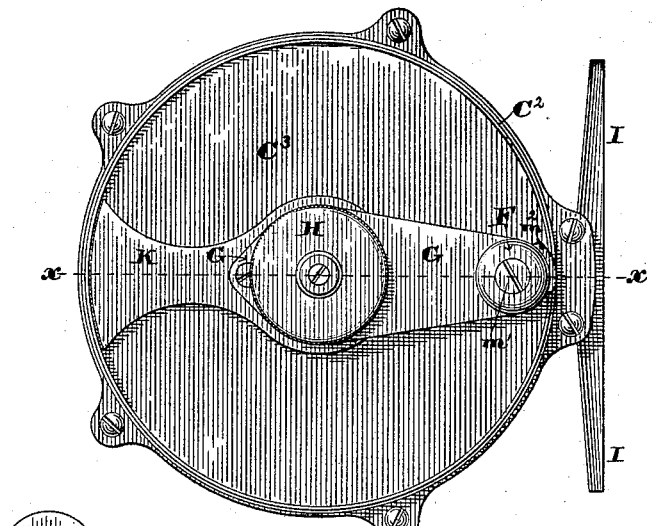
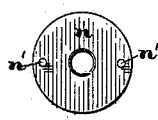
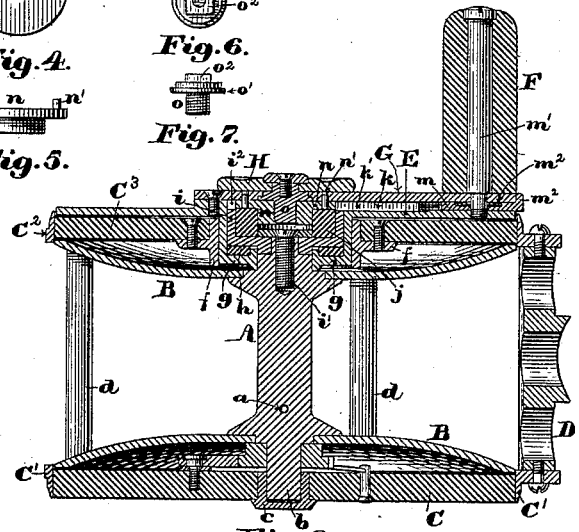
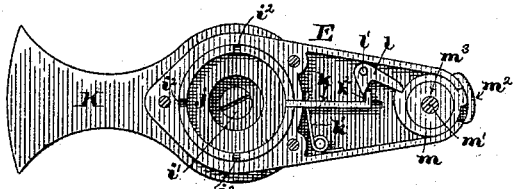
Witnesses:
Robert B. Eules.
Frank E. Gray.
Inventor:
George W. Prouty.
by Walter E. Lombard.
Attorney.

UNITED STATES PATENT OFFICE.

GEORGE W. PROUTY, OF BOSTON, MASSACHUSETTS, ASSIGNOR OF ONE-HALF TO RICHARD O. HARDING, OF SAME PLACE.

FISHING-REEL.

SPECIFICATION forming part of Letters Patent No. 396,956, dated January 29, 1889.

Application filed April 26, 1888. Serial No. 271,906. (Model.)

*To all whom it may concern:*

Be it known that I, GEORGE W. PROUTY, of Boston, in the county of Suffolk and State of Massachusetts, have invented certain new and useful Improvements in Fishing-Reels, of which the following, taken in connection with the accompanying drawings, is a specification.

My invention relates to fishing-reels, and has for its object the production of a reel which will automatically control the strain on the line when a fish is hooked, and will allow the fish when running away to draw the line from the reel by revolving the spool independently of the operating-handle, and by which the fish may be drawn within reach of the landing-net when the strain upon the line is less than the friction between the handle and the winding-spool.

My invention consists in certain novel features of construction, arrangement, and combinations of parts, which will be readily understood by reference to the description of the drawings and to the claims to be hereinafter given.

Of the drawings, Figure 1 represents a side elevation of my improved reel. Fig. 2 represents a sectional elevation of the same, the cutting plane being on line $x\ x$ on Fig. 1. Fig. 3 represents a plan of the operating-handle with its cover removed; and Figs. 4, 5, 6, and 7 represent details which will be hereinafter described.

In the drawings, A is the hub of the winding-spool, having secured thereon the disks B B, between which the line is wound upon the hub A, the end of said line being secured to said hub at $a$. One end, $b$, of the hub A is mounted and revolves in a bearing, $c$, secured to the rubber plate C, which is surrounded by the ring C′, which is secured to the rods $d\ d$ and block D, which connect said ring C′ with a similar ring, $C^2$, in which is secured another rubber disk, $C^3$, to the center of which the flanged ring $f$ is fastened by suitable screws. The ring $f$ forms a bearing for the hollow hub $g$ of the handle E, in which bearing said handle is revolved by the operator. Within the hollow hub $g$ is placed a friction-washer of rubber or leather, $h$, and also a metallic cup-shaped piece, $i$, which is firmly secured to the end of said hub A by means of a screw, $i'$, and is adapted to be revolved therewith. The rim of said cup-shaped piece $i$ is provided with one or more notches, $i^2$, with which the bolt $k$, pressed by the spring $k'$, is adapted to engage to lock said handle and spool, so that they will revolve together when desired.

The bolt $k$ is provided at its outer end with a lateral projection, $k^2$, which engages with one arm of the lever $l$, pivoted at $l'$ to the handle E, the other arm of which engages with and is operated by the lateral projection upon the disk $m$, which is adapted to be moved about the shank $m'$ of the handle E by means of the milled projection $m^2$, extending slightly beyond the end of the handle E in such a position that it may be readily operated by the angler without removing his hand from the handle. The shank $m'$ secures to the outer end of the handle E a cylinder, F, of hard rubber, at right angles to the said handle, by which it may more easily be revolved. The disk $m$ is provided with a shallow recess in its upper side, in which, about the shank $m'$, is mounted a convex washer, $m^3$, which may be compressed by turning the shank $m'$ to create a friction upon said disk to prevent its being accidentally turned and releasing the bolt $k$ when it is not desired so to do.

The interior of the cup-shaped hub $i$ is nearly filled by a washer, $j$, of rubber or similar material, against the upper surface of which abuts the disk $n$, which is made to revolve with said handle E by means of the pins $n'\ n'$, secured thereto and projecting into corresponding holes in the cover G of said handle. The disk $n$ is provided with a screw-threaded hole, into which is screwed the shank of the screw $o$, provided with an annular flange, $o'$, which fits into a recess in the under side of the cover G, and which is also provided with a squared upper end, $o^2$, projecting beyond the upper surface of said cover G, and upon which the milled head H is firmly clamped, so that said shank may be revolved by turning the said head to move the disk $n$ toward or from the spool, for the purpose of creating more or less friction between said handle E and the winding-spool, as desired, all in an obvious manner.

The block D is provided with two concave arms, I I, by which said reel is secured to the fishing-rod, in any well-known manner.

The ring C² projects beyond the outer surface of the disk or plate C³ in order to prevent the possible chance of the line getting caught between said disk and the handle E, and that this recess may not get filled up with dirt the lower plate of the said handle extends to the further side of said disk, as shown at K, and as this is revolved the disk is kept free from dirt. When a fish has been hooked, the angler commences to wind up the line upon the spool by turning the handle E; but should the fish turn and endeavor to run away the line would be given out, while the angler continued to turn the handle as if winding up the line, so that as soon as the actions of the fish cause any slack in the line it is immediately recovered and wound upon the spool. Should the angler desire to wind up the line without giving the fish an opportunity to run away, by moving the projection of the disk m into the position shown in the drawings the spool and handle are locked together, so that the friction device cannot operate; but as soon as said disk is moved to its opposite end of movement the friction device may be operated as soon as the strain upon the line is greater than the friction between the handle and the spool. One advantage of my improved reel is that it is so constructed that it is capable of resisting a much greater pull than any reel now in the market, while another advantage is that it is so made that it is impossible for dirt to get into its working parts and interfere with its operation. The fact that all the parts are so located that they may all be operated readily with one hand without removing the hand from the operating-handle is another advantage.

With the foregoing it is believed that my invention will be readily understood without any further description of its operation.

What I claim as new, and desire to secure by Letters Patent of the United States, is—

1. In a fishing-reel, the combination of the supporting-frame, a spool provided with journals revoluble in bearings in said frame, a handle so mounted upon one of said journals as to be revoluble thereon, and a washer so interposed between said handle and said spool as to create a friction between the same, in order that said spool may be rotated in one direction by said handle for the purpose of winding up the line, while it may be rotated in the opposite direction without turning said handle when the strain upon the line overcomes the friction between said washer and said handle and spool.

2. In a fishing-reel, the combination of the supporting-frame, a spool provided with journals revoluble in bearings in said frame, a handle so mounted upon one of said journals as to be revoluble thereon, a washer so interposed between said handle and said spool as to create a friction between the same, in order that said spool may be rotated in one direction by said handle for the purpose of winding up the line, while it may be rotated in the opposite direction without turning said handle when the strain upon the line overcomes the friction between said washer and said handle and spool, and a sliding bolt for positively locking said spool and handle when desired to prevent either from being revolved independently of the other.

3. In a fishing-reel, the combination of the supporting-frame, a spool provided with journals revoluble in bearings in said frame, a handle so mounted upon one of said journals as to be revoluble thereon, a washer interposed between said handle and said spool for the purpose of creating a friction between the same, a sliding bolt located in a recess in said handle, a slot or notch in the hub of said spool, with which said bolt is adapted to engage to positively lock said spool and handle together, a spring for moving said bolt in one direction, a bell-crank lever one arm of which engages with said bolt, and a milled thumb-piece for operating said lever to move said bolt in the opposite direction, which thumb-piece is so located that it may readily be operated by the angler's hand while turning the handle.

4. In a fishing-reel, the combination of the supporting-frame, a spool provided with journals revoluble in bearings in said frame, a handle so mounted upon one of said journals as to be revoluble thereon, a washer interposed between said handle and said spool for the purpose of creating a friction between the same, a sliding bolt secured to said handle, a slot or notch in the hub of said spool, with which said bolt is adapted to engage to positively lock said handle and spool together, a bell-crank lever one arm of which engages with said bolt, a disk secured to said handle and provided with a lateral projection, which engages with said lever to release said bolt from said slot or notch in the hub of the spool, and a spring adapted to press said bolt into engagement with said slot when it has been released from engagement with said lateral projection.

5. In a fishing-reel, the combination of the supporting-frame, a spool provided with journals revoluble in bearings in said frame, a cup-shaped piece secured to the end of one of said journals, a washer located within said cup-shaped piece, and a handle for rotating said spool, so mounted that a portion of its inner side will be pressed or held in close contact with said washer, thus creating a friction between the same, so that said spool will be rotated when said handle is turned in order to wind up the line, but will be revolved in the opposite direction when the strain upon the line is sufficient to overcome the friction between said handle and washer.

6. In a fishing-reel, the combination of the supporting-frame, a spool provided with journals revoluble in bearings in said frame, a cup-shaped piece secured to the end of one of said journals, a washer located within said cup-shaped piece, a handle for operating said spool, a disk secured to the axis of said handle and rotating therewith with one surface in contact with said washer, and a screw for adjusting said disk toward or from said washer to regulate the friction.

7. In a fishing-reel, the combination of the supporting-frame, a spool provided with journals revoluble in bearings in said frame, a cup-shaped piece secured to the end of one of said journals, a washer located within said cup-shaped piece, a handle for operating said spool and provided with an inwardly-projecting hollow hub which incloses said cup-shaped piece, an inwardly-projecting flange to said hub, and a washer located between said inwardly-projecting flange of the handle and the under side of said cup-shaped end piece.

In testimony whereof I have signed my name to this specification, in the presence of two subscribing witnesses, on this 25th day of April, A. D. 1888.

GEORGE W. PROUTY.

Witnesses:
WALTER E. LOMBARD,
FRANK E. BRAY.